United States Patent
Montag

(10) Patent No.: US 7,874,570 B2
(45) Date of Patent: *Jan. 25, 2011

(54) TOW BEHIND STEERABLE CADDY TRAILER

(76) Inventor: Roger A. Montag, 4337 - 560th Ave., West Bend, IA (US) 50597

( * ) Notice: Subject to any disclaimer, the term of this patent is extended or adjusted under 35 U.S.C. 154(b) by 1049 days.

This patent is subject to a terminal disclaimer.

(21) Appl. No.: 11/286,654

(22) Filed: Nov. 23, 2005

(65) Prior Publication Data

US 2007/0145713 A1    Jun. 28, 2007

(51) Int. Cl.
    *B62D 13/00*    (2006.01)
(52) U.S. Cl. ............ 280/442; 280/443; 280/444; 280/460.1
(58) Field of Classification Search ......... 280/442–444, 280/460.1, 81.6
    See application file for complete search history.

(56) References Cited

U.S. PATENT DOCUMENTS

| | | | | |
|---|---|---|---|---|
| 1,378,436 A * | 5/1921 | Arato | ............ | 280/442 |
| 1,379,982 A | 5/1921 | Hartsock | | |
| 1,600,635 A | 9/1926 | Isachsen | | |
| 1,811,798 A * | 6/1931 | Lucke | ............ | 280/419 |
| 1,838,499 A * | 12/1931 | Robinson | ............ | 280/444 |
| 1,999,748 A * | 4/1935 | Baratelli | ............ | 280/443 |
| 2,092,683 A | 9/1937 | Stidham | | |
| 2,450,215 A | 9/1948 | Wilson | | |
| 2,457,397 A * | 12/1948 | Richards | ............ | 280/143 |
| 2,559,487 A * | 7/1951 | Whitlow | ............ | 280/444 |
| 2,579,118 A * | 12/1951 | Land | ............ | 280/443 |
| 2,913,256 A * | 11/1959 | Sharpe | ............ | 280/444 |
| 3,430,975 A * | 3/1969 | Wolf | ............ | 280/103 |
| 3,753,580 A * | 8/1973 | Folkert | ............ | 280/443 |
| 4,171,825 A * | 10/1979 | Woodell | ............ | 280/443 |
| 4,208,063 A * | 6/1980 | Baker et al. | ............ | 280/445 |
| 4,405,147 A * | 9/1983 | Horsman et al. | ............ | 280/443 |
| 4,655,467 A * | 4/1987 | Kitzmiller et al. | ............ | 280/444 |
| 4,720,119 A * | 1/1988 | Ritter | ............ | 280/443 |
| 5,244,226 A * | 9/1993 | Bergh | ............ | 280/442 |
| 5,364,117 A | 11/1994 | Keith | | |
| 6,193,257 B1 * | 2/2001 | Lutz | ............ | 280/408 |
| 2004/0000772 A1 * | 1/2004 | Bruening et al. | ............ | 280/442 |

* cited by examiner

*Primary Examiner*—Lesley Morris
*Assistant Examiner*—Maurice Williams
(74) *Attorney, Agent, or Firm*—McKee, Voorhees & Sease, P.L.C.

(57) ABSTRACT

A steerable caddy trailer is provided that has an improved structure including a main frame assembly, spindle assemblies attached to each end of the main frame for attachment of a wheel, a pair of swinging arms forwardly extending from the main frame and pivotally attached to the main frame, and tie rods connecting the swinging arms with the spindle assembly such that pivoting of the swinging arms steers the wheels.

7 Claims, 3 Drawing Sheets

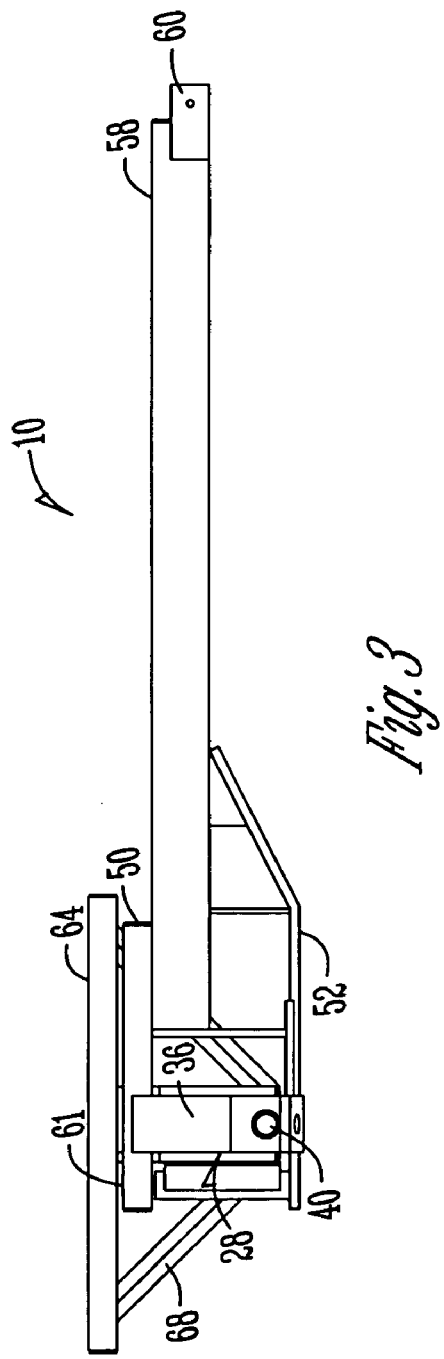
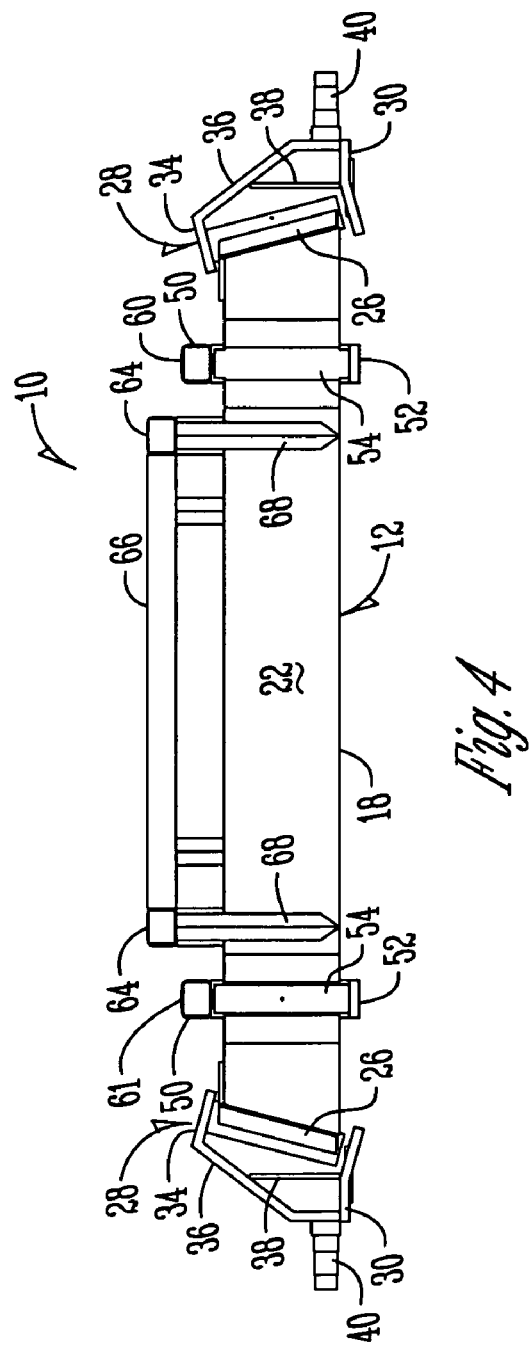

TOW BEHIND STEERABLE CADDY TRAILER

BACKGROUND OF THE INVENTION

The invention generally pertains to trailers and specifically to trailers designed for a tight turning radius.

Prior art trailers have been designed which provide a tight turning radius; however, these trailers use complicated structures to turn the trailer's wheels.

U.S. Pat. No. 1,600,635, issued to Isachsen on Sep. 21, 1926, shows an arrangement of a frame 11, and a steering rod 7 independent of the frame 11. The steering rod 7 is fastened to crank arm 3, then secured to a knuckle joint 4, and connected to a second knuckle joint 4' using arms 5 and a connecting bar 8. This complicated structure functions to turn the wheels 10.

U.S. Pat. No. 2,450,215 issued to Wilson on Sep. 28, 1948, uses multiple arms and steering links 29 and 14. This complicated structure functions to turn the wheels 24.

U.S. Pat. No. 2,092,683, issued to Stidham on Sep. 7, 1937, shows a non-conventional system using parallel cable 32 and a draw frame system 21. These two systems must operate together in order to turn the wheels 14.

The above-subject patents are all structures which function to permit the wheels to turn on stub axles. Unfortunately, each is a complicated structure and includes multiple moving parts.

Therefore, there is a need to produce a simplified structure with fewer moving parts to reduce costs associated with manufacturing, tooling and assembly.

Additionally, the complicated structures limit the amount of weight that may be placed upon them. Accordingly, it is a still further objective of the present invention to provide a trailer that may have a high maximum payload for hauling a great amount of weight associated with farm products such as spray tanks, fertilizer, and seed.

These and other objectives will become apparent from the following specification and drawings.

BRIEF SUMMARY OF THE INVENTION

The foregoing objectives may be achieved using a tow behind steerable caddy trailer having a main frame assembly having opposite ends, a wheel pivotally attached to each end of the main frame assembly, a pair of swinging arms pivotally attached to the main frame assembly and extending forward from the main frame. The swinging arms are spaced apart from one another such that each swinging arm is positioned adjacent a wheel. The swinging arms can be maintained parallel or non-parallel to one another. The trailer has a support structure attached to the main frame assembly that can support a platform, tank, hopper, etc. Additionally, it has been contemplated that tracks could be used in place of the wheels for supporting platforms, tanks and hoppers exceeding the weight limits for a wheel.

BRIEF DESCRIPTION OF THE DRAWINGS

FIG. 3 is a side view of the tow behind steerable caddy.

FIG. 4 is a rear view of the tow behind steerable caddy.

DETAILED DESCRIPTION OF THE PREFERRED EMBODIMENT

Figure 1:
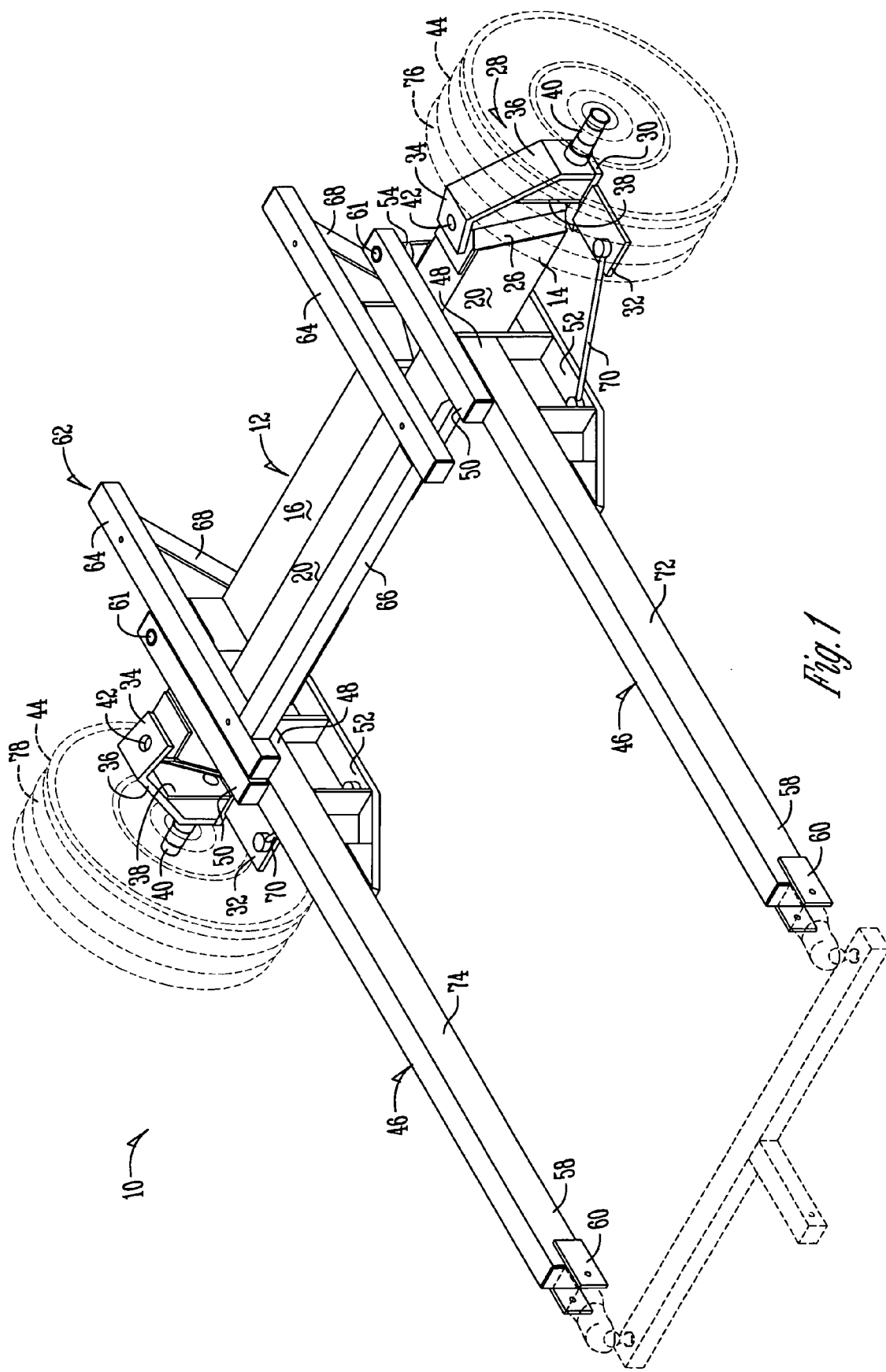
FIG. 1 is a perspective view of a tow behind steerable caddy.
Figure 2:
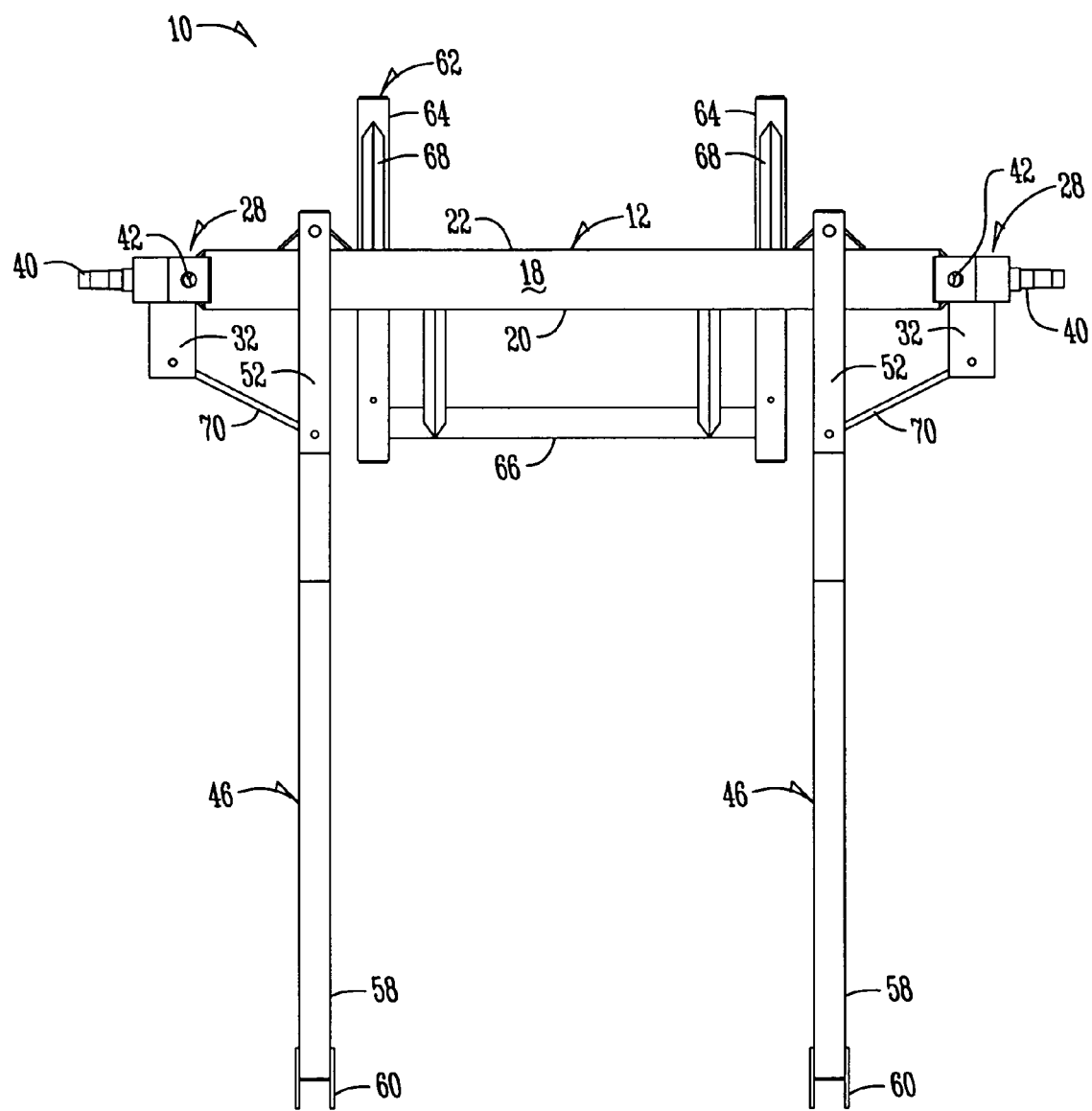
FIG. 2 is a top view of the tow behind steerable caddy.

With reference to FIGS. 1-4, numeral 10 refers to a tow behind steerable caddy. The tow behind steerable caddy trailer 10 is designed to follow behind a tractor, an implement pulled by a tractor, or other vehicle.

The trailer 10 is designed to follow in the tracks of the towing vehicle to navigate tight turning radiuses. The tow behind steerable caddy trailer 10 thus may negotiate tight turning radiuses in a field with very few end rows or with equipment that has a very narrow operating width.

The steerable caddy trailer 10 has a main frame assembly 12 illustrated as a metal square tube. The main frame assembly 12 has opposite ends 14, a top side 16, a bottom side 18, a front side 20, and a back side 22. Angled end caps 26 are attached at each end 14 of the main frame assembly 12. It has been contemplated that the end caps 26 could also be a vertical endcap rather than an angled endcap 26. A vertical endcap may be used in conjunction with a track or in applications requiring additional structural strength to support heavy loads.

A spindle assembly 28 is pivotally attached at each end 14 of the main frame assembly 12. The spindle assembly 28 has a base plate 30 and a top plate 34 connected by an angled extension 36 which ends in a vertical surface with a spindle 40 for a wheel 44. The base plate 30 and top plate 34 are attached to the angled end cap 26 by a pivot pin 42. The spindle assembly has a vertical support 38 which strengthens the connection of the base plate 30 and the top plate 34 to strengthen the spindle assembly 28.

A forward base member 32 is provided to extend from the base plate 30 and has a hole for connecting a first end of a tie rod 70.

Swinging arms 46 extend from the main frame assembly 12. Each swinging arm member 46 has a rear end 48 that pivotally attaches to the main frame assembly 12. The rear end 48 has a top support 50 and a bottom support 52, which extends above and below the main frame assembly 12 to pivotally attach to a cylinder 54 at the back side 22 of the main frame assembly 12 by a pivot pin 61. The bottom support 52 also has a hole for receiving a front end of tie rod 70. A front end 58 of the swinging arm members 46 has an adapter 60 for attaching to a rigid cross member, such as the exemplary rigid cross member shown in FIG. 1 in dashed lines. The rigid cross member could be a piece of square tubing (as shown). The rigid cross member could also be a bumper, a vehicle, a tractor or other farm implement. It is preferred that the swinging arm members 46 be pivotally mounted to a rigid cross member. For example, attaching a hitch to the adapter 60 and a ball to both ends of the rigid cross member (as shown in FIG. 1 in dashed lines) allows the swinging arm members 46 to pivot about the balls. Similarly, swinging arm members 46 could also be pivotally attached to a bumper or another rigid cross member as part of a farm implement.

In FIG. 1, the swinging arm members 46 are shown parallel to each other and the tires 44 are shown perpendicular to the main frame assembly 12. However, the swinging arm members 46 need not be parallel to each other for the trailer 10 to steer. Adjusting the swinging arm members 46 affects the turning radius of the steerable caddy trailer 10. Regardless of the configuration, whether the swinging arm members 46 are parallel or moved inward closer to each other, the tie rods 70 can be adjusted to keep the tires perpendicular to the main frame assembly 12.

A platform support 62 is provided that has side supports 64 and a front support 66 connecting the two side supports 64 and sub-platform supports 68. The platform support 62 balances the weight of a platform, tank, hopper or other evenly towards the front and back of the main frame assembly 12.

In operation, the caddy is pulled behind the implement and/or vehicle by pivotally connecting the swinging arm members 46 to a rigid cross member. Should the towing vehicle or farm implement turn left this will simultaneously cause the left swinging arm 72 to shift rearward toward the main frame assembly 12 and the right swinging arm 74 to shift forward away from the main frame assembly 12. Shifting the left swinging arm 72 rearward towards the main frame assembly causes the tie-rod linkage 70 to move the spindle assembly such that the left wheel 76 steers right. Similarly, shifting the right swinging arm 74 forward away from the main frame assembly causes the tie-rod linkage 70 to move the spindle assembly such that the right wheel 78 steers right, also. Thus, when the towing vehicle turns left the wheels 44 on the steerable caddy 10 turn right so as to track the towing vehicle.

Should the towing vehicle or farm implement turn right this will simultaneously cause the left swinging arm 72 to shift forward away from the main frame assembly 12 and the right swinging arm 74 to shift rearward toward the main frame assembly 12. Shifting the left swinging arm 72 forward away from the main frame assembly causes the tie-rod linkage 70 to move the spindle assembly such that the left wheel 76 steers left. Similarly, shifting the right swinging arm 74 rearward toward the main frame assembly causes the tie-rod linkage 70 to move the spindle assembly such that the right wheel 78 steers left, also. Thus, when the towing vehicle turns left the wheels 44 on the steerable caddy 10 turn right so as to track the towing vehicle.

In either instance after the towing vehicle turns left or right and returns to driving a straight course, the wheels 44 return to a position perpendicular to the main frame assembly 12. In this fashion, the steerable caddy trailer is maintained in virtually the same turning radius as the vehicle and/or implement.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A steerable caddy trailer comprising:
   a main frame assembly having opposite ends;
   a pair of wheels, each wheel pivotally attached to an end of the main frame assembly;
   a pair of swinging arms comprising a rear end and front end, the rear end of each swinging arm pivotally attached directly to the main frame assembly adjacent a wheel, each swinging arm extending forward from the main frame assembly and terminating in a front end adapted for attaching to an assembly adapted for towing, and each swinging arm moving substantially independent of the other;
   a pair of tie rods, each tie rod connecting a wheel to an adjacent swinging arm; and
   a support structure attached to the main frame assembly for supporting a payload.

2. The trailer of claim 1 wherein the support structure is attached to the main frame assembly independent of the pair of swinging arms to balance the payload on the main frame assembly.

3. The trailer of claim 1 wherein each wheel is pivotally attached to the main frame by a spindle assembly, the spindle assembly extends outward to the wheel from above and below an end of the main frame assembly.

4. The trailer of claim 3 wherein each end of the main frame assembly further comprises an angled end cap.

5. The trailer of claim 4 wherein the spindle assembly comprises a base plate and a top plate pivotally attached to the angled end cap by a pivot pin.

6. The trailer of claim 5 wherein the spindle assembly further comprises an angled extension connected to a vertical portion, the angled extension and vertical portion connected between the base plate and the top plate.

7. The trailer of claim 6 wherein the spindle assembly further comprises a spindle connected to the vertical portion for rotatably mounting a wheel to the spindle assembly.

* * * * *